UNITED STATES PATENT OFFICE.

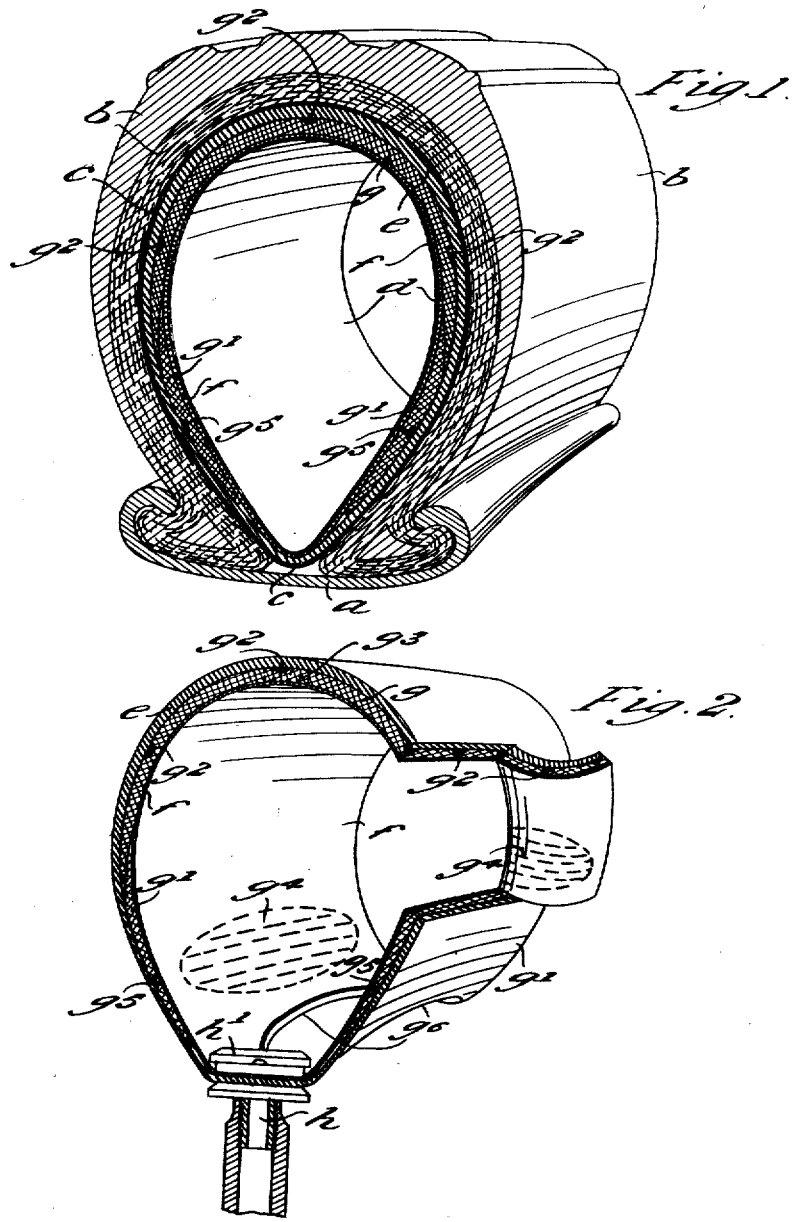

MATTHEW SINCLAIR STEVENSON, OF LONDON, ENGLAND.

PNEUMATIC TIRE.

1,202,604.   Specification of Letters Patent.   Patented Oct. 24, 1916.

Application filed January 24, 1916. Serial No. 73,968.

*To all whom it may concern:*

Be it known that I, MATTHEW SINCLAIR STEVENSON, a subject of the King of Great Britain, residing in London, England, have invented certain new and useful Improvements in or Relating to Pneumatic Tires, of which the following is a specification.

My invention relates to that class of pneumatic tires which comprise two air tubes one within the other and each independently inflatable, and it consists in improvements according to which the inner of the two air tubes, hereinafter referred to as the spare tube, is wholly or partly surrounded with a protective covering or shield, which is formed of materials and in a manner to allow of the shield expanding and contracting as the spare tube is inflated or deflated.

The invention will be described with reference to the accompanying drawing, in which—

Figure 1 is a perspective cross section showing an inflated spare inner tube protected according to this invention and disposed within an ordinary tire comprising an inner pneumatic tube and an outer cover fitted to a wheel rim; and Fig. 2 is a sectional perspective view showing how the elements of the protective shield of the spare inner tube are assembled together, and means for preventing the said tube being depressed into the mouth of the ordinary inflating valve and for holding the assembled elements in position.

In both figures corresponding parts are similarly lettered.

In Fig. 1 $a$ denotes a wheel him, $b$ is an outer cover of any appropriate make, $c$ an ordinary inner pneumatic tube, and $d$ the internal spare tube which is surrounded by a protective casing or shield as will be now explained.

The protective covering consists of an inner tread member $e$ which may be of contractile rubber and of suitable thickness or be composed of one or more layers or thicknesses of drown bark rhea fiber canvas embedded in rubber and mounted on a backing of similar canvas. The tread member $e$ may extend partly or wholly around the inner spare tube. The tread member $e$ incloses a number of bands or a stocking-like element $f$. The stocking, and if necessary the tread member also, may be provided with longitudinal openings $g^6$ (Fig. 2) on the side next to the rim for assembling purposes. The bands or stocking may be composed of stout rubber webbing, or of other yielding or elastic material or materials. On the bands or stocking are placed several tread strips $g$ and side strips $g'$ of sheet leather or other tough but yielding material, of suitable lengths and thickness and arranged to overlap each other to greater or less extent. The side strips $g'$ may be quite distinct from the tread strips $g$. The strips $g$, $g'$ may either lie loosely upon or be attached at one or more points (as for instance at $g^3$ and $g^4$, Fig. 2) to the stocking $f$. The points of attachment of the bands or stocking $f$ are so spaced that as the spare inner tube is inflated the stocking or bands together with the tread member and strips, will gradually assume a correct and snug position between the crown of that tube and the inside surface of the other or inclosing inner tube.

The strips $g$, $g'$ are preferably grooved or indented, as indicated at $g^2$ $g^5$, respectively, so that when the spare tube is in an inflated condition the strips will, under the pressure exerted by the tube, be firmly held in contact with the tread $e$, the material of which completely fills the indentations so that creeping becomes impossible.

Owing to the lengthwise or circumferential overlapping of the strips $g$, $g'$ of leather or the other material used, and the method of their attachment to the bands or stocking $f$, the spare tube when partly or wholly deflated permits the material of the bands or stocking to contract or sag, while the leather or other strips $g$, $g'$, by sliding movements over one another, assume positions wherein they constitute a ring of smaller circumference and effectively hold the protecting covering from moving about, while at the same time they protect the spare tube from harm in the event of the puncture of the ordinary outer or inclosing inner tube.

By reason of the contractile character of the protecting covering or shield, it will, when the spare tube is in a deflated or partly deflated condition, be kept apart from or out of contact with the peripheral portion of the ordinary or outer inner tube. The protecting covering or shield being made in stocking or sleeve-like fashion is readily slipped or drawn over the spare tube in the course of the manufacture. The inner tread member $e$, the bands or stocking $f$ and the protective shield parts $g$, $g'$ can be slipped over the inflating valve of the spare tube and be thus held in place.

The protective covering and spare tube, as well as the ordinary or inclosing inner tube, are kept in position on the wheel rim by means of the two inflating valves. One of these valves attached to the ordinary inner tube can be held firmly in position on the wheel rim by any of the usual well known methods, while the other valve is attached to the spare inner tube and passing through the elastic stocking $f$, the contractile rubber or rubberized member $e$, if encountered, and the inclosing inner tube $c$ in some suitable air-tight manner can be also held in position on the rim in any suitable manner. These valves are preferably positioned opposite each other, say 180° apart, so that the improved tire can be used on any rim that is adapted to receive and hold a pneumatic tire, provided a second valve hole (not shown on the drawing) be formed in the rim opposite the other or ordinary valve hole.

Means are preferably provided for preventing the spare tube, when inflated, from being depressed into the orifice of the inflating valve of the inclosing inner tube. Such means may, as shown in Fig. 2, comprise a setscrew $h$ having a flat head $h'$, and a hollow spindle which, after the several parts are assembled, is screwed through one or more of the parts, in order to hold it or them in position, and into the valve orifice which would be threaded for the purpose.

Laterally directed ducts communicating with the passage through the hollow spindle are provided in or on the underside of the head of the setscrew to allow of air being pumped through the valve into the outer of the inner tubes. The spare inner tube can be inflated to a desired extent by means of the second valve above referred to. When the spare tube is not in use it is preferable to keep it slightly inflated.

In practice, when the improved tire has been secured to the rim and the outer cover adjusted in proper position, the outer of the two inner tubes is inflated. Should a puncture occur, the car would be jacked up in the usual manner and the spare inner tube fully inflated, the ends of the leather strips sliding over each other so as to form a larger circumference and thus thoroughly protect the inner or spare tube. As soon as the spare tube is inflated the jack can be removed and the car is ready to proceed again. If, while the spare tube is inflated, a nail or other puncturing body penetrates the outer cover, the ordinary inner tube and the inner tread member $e$ around the spare inner tube, and reaches a leather strip $g$ of the protective shield, the said leather strip being mounted on the yieldable rubber webbing of the pocket-forming bands or stocking will itself yield and merely momentarily cause an indent in the spare tube but not a puncture, as would be the case if the rubber webbing of the band or stocking were replaced with firm non-yielding canvas. The leather would simply press upon the inflated spare inner tube which, being the softer, will yield under the pressure transmitted through the leather.

Having thus described the said invention and the best means I know of carrying the same into practical effect, I claim:

1. A pneumatic tire of the kind herein referred to, comprising, in combination, an inner air tube, an outer cover embracing the inner air tube, a second or spare inner air tube, inclosed within the first said air tube, means whereby either air tube can be separately inflated, and a protective shield of a puncture-resisting nature interposed between the said inner tubes.

2. A pneumatic tire of the kind herein referred to, comprising, in combination, an inner air tube, an outer cover embracing the inner air tube, a second or spare inner air tube, inclosed within the first said air tube, means whereby either air tube can be separately inflated, and a protective shield of a puncture-resisting nature interposed between the said inner tubes, and means for retaining the tubes and shield in the relative assembled positions.

3. In a pneumatic tire of the kind herein referred to, the combination with an outer cover, an inner air tube, a second or spare inner air tube and means whereby either air tube can be separately inflated, of a puncture-resisting shield capable of expanding or contracting according as the said spare inner tube is respectively inflated or deflated, said shield being arranged between the said inner tubes.

4. In a pneumatic tire of the kind herein referred to, the combination with an outer cover, an inner air tube, a second or spare inner air tube and means whereby either air tube can be separately inflated, of a puncture-resisting shield embodying an outer or tread member of contractile substance, an inner or stocking member of elastic material arranged adjacent to the spare inner tube and a plurality of overlapping strips of tough and yieldable material interposed between the said tread and stocking members.

5. In a pneumatic tire of the kind herein referred to, the combination with an outer cover, an inner air tube, a second or spare inner air tube and means whereby either air tube can be separately inflated, of a puncture-resisting shield embodying an outer or tread member of contractile substance, an inner or stocking member of elastic material arranged adjacent to the spare inner tube and a plurality of overlapping strips of tough and yieldable material interposed between the said tread and stocking members, said strips having on their outer faces a number of indentations as and for the purpose described.

6. In a pneumatic tire, the combination with an outer cover, an inner air tube fitted with an inflating valve and a second or spare inner tube having also an inflating valve, of a puncture-resisting shield arranged between the said inner tubes and capable of expanding and contracting according as the said spare inner tube is inflated or deflated, and means attached to the first said air inflating valve and adapted to prevent the depression of the spare inner tube within the mouth or orifice of the said valve.

In testimony whereof I have signed my name to this specification in the presence of two subscribing witnesses.

MATTHEW SINCLAIR STEVENSON.

Witnesses:
JOSEPH MILLARD,
WALTER J. SKERTEN.